United States Patent Office 3,201,375
Patented Aug. 17, 1965

3,201,375
USE OF ACYL PEROXIDES AS CATALYSTS IN THE PREPARATION OF ACRYLONITRILE-STYRENE-ALPHA-METHYL-STYRENE TERPOLYMERS
Arnold B. Finestone, Leominster, and James S. Pavlin, Fitchburg, Mass., assignors to Foster Grant Co., Inc., Leominster, Mass., a corporation of Delaware
No Drawing. Continuation of application Ser. No. 21,146, Apr. 11, 1960. This application Nov. 24, 1964, Ser. No. 413,649
10 Claims. (Cl. 260—80.5)

This is a continuation of application Serial No. 21,146, filed April 11, 1960, now abandoned.

This invention relates to the new and novel method of preparing polymeric compositions consisting essentially of styrenes and acrylonitrile which are readily moldable to clear and substantially non-discolored products by conventional means, such as by compression or injection molding, hot-pressing, welding, extrusion, or the like. More particularly, this invention relates to the new and novel method of preparing a polymeric composition consisting of from about 65% to 80% by weight of styrene and alpha-methylstyrene and from about 35% to 20% by weight of acrylonitrile, which polymers are known as "solvent-resistant" resins, viz. resins that are relatively resistant to attack by such liquids as gasoline, alcohol, water, aqueous bases, even though they are swellable and/or dispersible in such liquids as methyl ethyl ketone.

Thermoplastic resinous compositions of from about 65% to 80% by weight of styrene and from about 35% to 20% by weight of acrylonitrile are known. These compositions are strong, hard, rigid thermoplastic materials and have been previously prepared by a thermal bulk polymerization or a thermal solution polymerization at temperatures ranging from about 100° C. to about 180° C. under pressure. In the preparation of such compositions by a thermal solution polymerization, hydrocarbon diluents such as benzene, ethylbenzene, or the like are used, and such a polymerization process usually requires elaborate equipment to control the reaction and to remove unreacted monomers and/or diluents. In such a polymerization it has been found advantageous to avoid the use of organic catalysts because of their effect on the acceleration of the reaction rate thus increasing the potential for an uncontrollable strong exothermic or "runaway" polymer reaction.

Also known in the art is the polymerization of styrene and acrylonitrile in the presence of an emulsifying agent. Products thereby produced have not received commercial acceptance because of the great difficulty in obtaining a clear and non-discolored product. In emulsion polymerization systems, it is necessary to take elaborate precautions to control the ultimate molecular weight of the final product, and, because of the high water solubility of acrylonitrile, it is extremely difficult to obtain a uniform product. In general, a higher percentage of acrylonitrile than that required in the copolymerization is usually charged to a reactor in order to compensate for the solubility of the monomer in water.

It is also known in the art that the polymerization of styrene and acrylonitrile can be carried out in the presence of a suspending agent and that products thereby made have also not received commercial acceptance because of the great difficulty in producing non-discolored products. With respect to this type of polymerization, a relatively clear product can be obtained because of the ease with which the suspending agent is removed, but the product is limited by the color produced. With the suspension system, as with the emulsion system, a greater concentration of acrylonitrile must be charged to a reactor in order to compensate for the solubility of the acrylonitrile in water.

With respect to copolymers of styrene and acrylonitrile in the foregoing concentration, viz. "solvent resistant" thermoplastic resinous compositions, it is known that such copolymers having average molecular weights such that 10% by weight solutions of the copolymers in methyl ethyl ketone have viscosities between 6 and 40, preferably 10 and 30, centipoises at a temperature of 25° C. usually possess the most desirable combination of mechanical properties, viz. strength, hardness and flexibility, and molding behavior, viz. flow rate, which combination of mechanical properties and molding behavior is related to the average molecular weight of the copolymer.

Heretofore, it has been difficult to prepare consistently good copolymer products in the foregoing proportions which are readily moldable to clear and non-disclored products and which have satisfactory mechanical and molding behavior. The reasons therefore are quite evident. That the copolymerization reaction in which copolymers in the foregoing proportions are formed is vigorously exothermic is well known as are the facts that the rate of polymerization reaction increases with an increase in reaction temperature and that the average molecular weight of the copolymer product decreases with such increase in reaction temperature. At temperatures at which the copolymerization is readily controlled, the rate of production of the copolymer is undesirably slow and the molecular weight of the copolymer is undesirably high. On the other hand, the carrying out of the copolymerization at the temperatures at which the copolymer would have a desirable average molecular weight results in a copolymerization process wherein the rate of reaction is so great as to make the control of the reaction extremely difficult.

In general, therefore, raising the temperature at which polymerization is carried out to lower the molecular weight of the product is often undesirable since it involves a considerable increase in the rate of reaction and may result in an uncontrollable strongly exothermic or "runaway" polymer reaction or in the discoloring of the polymeric product by overheating this product. It is generally well known in the art that the stability of an aqueous suspension polymerization is dependent upon the suspending agent used, the agitation, and in some cases the rate of polymerization. With respect to the polymerization of styrene monomers and the copolymerization of styrene and acrylonitrile monomers it has in the past been found to be most advantageous to carry out the polymerization at a temperature varying between 70° C. and 130° C., and preferably between 75° C. and 120° C. In these cases pressure is sometimes required dependent upon the temperature used. However, since the non-catalytic thermal rate of polymerization of styrene and styrene-acrylonitrile at such temperatures are very slow, the presence of a catalyst in such aqueous suspensions is necessary to increase the polymerization rate in order to obtain a practical commercial polymerization cycle without elaborate pressure equipment.

We have now discovered that it is economically possible to produce a polymer, in the form of fine beads and of commercially acceptable color, of styrene and acrylonitrile, in the above mentioned proportions, by polymerization in aqueous suspension at relatively low temperatures, viz. 60° C. to 125° C., and more preferably between 65° C. and 90° C., by utilizing in combination a water insoluble aliphatic peroxide catalyst having the general formula (1) $[CH_3(CH_2)_nCO]_2O_2$ wherein $n$ is an integer greater than two, preferably an integer from 6 to 16, such a catalyst being exemplified by caprylyl or octanoyl peroxide having the formula (2) $[CH_3(CH_2)_6CO]_2O_2$ by lauroyl peroxide having the formula (3) $[CH_3(CH_2)_{10}CO]_2O_2$ by myristyl peroxide having the formula (4) $[CH_3(CH_2)_{12}CO]_2O_2$ and by stearyl peroxide having the formula (5) $[CH_4(CH_2)_{16}CO]_2O_2$ and a third comonomer of the monovinyl aromatic type, i.e., alpha-methylstyrene. The styrene-acrylonitrile polymers thus prepared in the presence of the aforementioned insoluble aliphatic peroxide catalyst and the monovinyl compound such as alpha-methylstyrene have acceptable high uniformity, good color, and color stability and do not appreciably discolor and are readily moldable to substantially clear and non-discolored shaped products by conventional means.

More specifically, we have found that desirable polymeric compositions consisting of from about 65% to 80% by weight of styrene and alpha-methylstyrene and from about 35% to about 20% by weight of acrylonitrile can be produced by suspension polymerization in the presence of a catalyst of the aforementioned type, the comonomer alpha-methylstyrene being present in the proportion of from about 5 to 35% of the total amount of monomers.

While we have disclosed that percentage of alpha-methylstyrene ranging from about 5% to about 35% by weight of the composition may be employed, we have also found that these percentages may be somewhat reduced in some cases, but not eliminated, by the incorporation in the system of commonly known and previously used chain transfer agents, i.e., mercaptan, aliphatic halogenated compounds, aromatic hydrocarbons, unsaturated dimers of monomeric alpha-alkyl aromatic compounds, i.e., the dimer of alpha-methylstyrene, etc. In some cases, and depending upon the properties desired in the final product, an expedient of this type may be employed.

Heretofore it has been taught in the art that catalysts such as benzoyl peroxide and aliphatic peroxides were equivalents for all purposes in suspension systems. However, to all intents and purposes, this is not essentially correct since the rate of initiation of polymerization of the two catalysts is not equivalent. Specifically, it has been found that the efficiency of an aliphatic peroxide is lower than that of an aromatic peroxide of the type benzoyl peroxide in this polymerization system. Furthermore, the thermal rate of decomposition of an aliphatic peroxide is considerably faster at the same temperatures than that of an aromatic peroxide such as benzoyl peroxide, which is the catalyst most commonly used in suspension polymerization of styrene alone and with other comonomers. When benzoyl peroxide is used as catalyst in the suspension polymerization of two comonomers such as styrene and acrylonitrile, polymerization can be successfully accomplished without the use of a third comonomer such as alpha-methylstyrene. However, the polymeric materials produced are at a considerable commercial disadvantage when molded since the thermal conditions required for molding badly discolor the products. While it is possible to slow down the rate of polymerization by incorporation of a third comonomer such as alpha-methylstyrene and thereby lower the viscosity, molded products still suffer from the same disadvantage of discoloration which can be attributed to the catalyst. When an aliphatic peroxide is substituted for benzoyl peroxide at the same temperature without a third comonomer such as alpha-methylstyrene being present in the system, the control of the suspension stability of the system is difficult since the rate of polymerization is extremely rapid. Since the mole concentration of the aliphatic peroxide must be greater than benzoyl peroxide because of poorer efficiency, even with higher concentrations equivalent solution viscosities can not be attained unless an uneconomical amount of catalyst is used. Employment of alpha-methylstyrene in the above mentioned range enables successful polymerization with the use of considerably less aliphatic peroxide, thereby reducing the rate of polymerization to a satisfactory level with resultant production of a molecular weight in the commercially acceptable range. Since acrylonitrile possesses a high water solubility, it was initially necessary to charge between 2 and 10% excess of acrylonitrile than that desired in the final product. Most efficient polymerization is achieved by controlling the polymerization so that it may be readily stopped at a conversion in the range of about 60 to 92%, preferably between 65 and 85%, based on the monomer charge, in order to produce a uniform copolymer. If the polymerization is therefore carried beyond the desirable limit, a non-uniform copolymer will be produced. The generation of this non-uniformity will occur toward the end of the reaction. Some long repeat units of acrylonitrile in the chain are known to be sites of thermal discoloration either by an intermolecular reaction or by an intra molecular cyclization. It is essential that the recovery of monomer not only include the excess of acrylonitrile but also that it include some styrene and alpha-methylstyrene. In addition, it is generally known that at high conversions acrylonitrile in the copolymer has a tendency to crosslink and gel thereby affecting the final physical product.

An object of this invention is to prepare "solvent resistant" resinous compositions from styrenes and acrylonitrile in aqueous suspension in the presence of a water insoluble aliphatic peroxide catalyst.

Another object of this invention is to prepare, in the form of beads which are readily moldable to clear and non-discolored products, a thermoplastic resinous composition consisting of 30 to 75% by weight of styrene, 35 to 5% by weight of alpha-methylstyrene, and 35 to 20% by weight of acrylonitrile by polymerization at a relatively low temperature, viz. between about 60° C. and about 125° C., and preferably between 65° C. and 90° C., of a polymerizable composition comprising 30 to 75 parts of styrene, 35 to 5 parts of acrylonitrile, and 2 to 10 parts of acrylonitrile in excess in the presence of a water insoluble aliphatic peroxide catalyst and wherein the conversion of the monomer to polymer is contained between 60 and 92%, preferably between 65 and 85%, based on the total charge.

Other objects of this invention will become readily apparent from the following detailed description which is merely illustrative of this invention and does not limit this invention.

Preparation of polymers in accordance with the invention consisting of 20 to 35% by weight of acrylonitrile and 80 to 65% by weight of styrene and alpha-methylstyrene is carried out by copolymerization of a monomer charge consisting of 20 to 35 parts of acrylonitrile, 2 to 10 parts of acrylonitrile in excess, and from 80 to 65 parts of styrene and alpha-methylstyrene in an aqueous suspension at temperatures between preferably about 65° C. and about 90° C. in the presence of a water insoluble aliphatic peroxide catalyst having the general Formula 1, and examples of a suitable catalyst are caprylyl peroxide, lauroyl peroxide, myristyl peroxide and stearyl peroxide. The catalyst is present in the aqueous suspension in amounts of from about 0.02% to 2.0%, and preferably between 0.1% to 1.6%, by weight of the combined weight of the monomers charged.

It is essential during the course of this polymerization that a known dispersing or suspending agent of the general types of calcium hydroxyapatite, tricalcium phosphate, talc, polyacrylamide, methyl cellulose, methyl starch, glycol cellulose, polyvinyl alcohol, styrene-maleic acid copolymers, and other known inorganic suspending agents as well as organic polymeric suspending agents be included. In the above process it is preferred that calcium hydroxyapatite be used as the suspending agent with or without known stabilizing electrolytes.

It is further essential that, during the course of this polymerization, an anti-oxidant, viz. 2,6-di-t-butyl 4-cresol, be included. Since under normal reaction conditions it is extremely difficult to purge the system of the last traces of oxygen, the addition of an anti-oxidant of the above type helps to overcome this problem.

spective compounds and the temperature conditions being shown in Table I.

Examples 1–15, inclusive, show methods for preparing polymer beads under autogenous pressure.

*Table I*

| Ex. | Styrene parts | α-methyl-styrene parts | Acrylonitrile parts | Lauroyl peroxide parts | Caprylyl peroxide parts | Benzoyl peroxide parts | Polymerization temperature, °C. | Conversion, percent | Acrylonitrile, percent combined | Viscosity, 10% in MEK | Color index No. of copolymer beads | Heat stability color index No. at— 370° F. | Heat stability color index No. at— 450° F. |
|---|---|---|---|---|---|---|---|---|---|---|---|---|---|
| 2 | 25 | 7.5 | 17.5 | 0.7 | | | 90 | 75 | 25.3 | 10.4 | 1 | 2 | 7 |
| 3 | 25 | 7.5 | 17.5 | 0.35 | | | 80 | 78 | 25.5 | 16.7 | 1 | 3 | 7 |
| 4 | 24.5 | 10.5 | 15 | 0.7 | | | 80 | 75 | 24.7 | 12.2 | 1 | 2 | 5 |
| 5 | 25 | 12.5 | 12.5 | 0.7 | | | 80 | 82 | 22.5 | 10.1 | 1 | 1 | 3 |
| 6 | 25 | 12.5 | 12.5 | 1.0 | | | 80 | 80 | 23.3 | 9.1 | 1 | 2 | 4 |
| 7 | 22.5 | 7.5 | 20 | 0.7 | | | 77 | 85 | 26.9 | 18.2 | 1 | 3 | 8 |
| 8 | 32.5 | | 17.5 | | | 0.43 | 80 | 75 | 25.7 | 16.2 | 3 | 13 | >20 |
| 9 | 37.5 | | 12.5 | | | 0.43 | 80 | 70 | 22.8 | 11.8 | 3 | 11 | >20 |
| 10 | 25 | 7.5 | 17.5 | | | 0.43 | 80 | 80 | 26.1 | 12.2 | 3 | 11 | >20 |
| 11 | 25 | 7.5 | 17.5 | | 0.5 | | 80 | 80 | 25.5 | 13.7 | 1 | 2 | 5 |
| 12 | 25 | 7.5 | 17.5 | | 0.42 | | 80 | 75 | 25.9 | 15.2 | 1 | 2 | 5 |
| 13 | 25 | 12.5 | 12.5 | | 0.5 | | 80 | 85 | 22.9 | 10.4 | 1 | 2 | 4 |
| 14 | 25 | 12.5 | 12.5 | | 0.6 | | 80 | 75 | 23.1 | 9.1 | 1 | 2 | 5 |
| 15 | 22.5 | 7.5 | 20 | | 0.05 | | 80 | 83 | 26.5 | 26.1 | 1 | 3 | 7 |

An arbitrary scale of color index numbers for visually comparing the copolymer beads formed in accordance with this invention with copolymer beads formed in an aqueous suspension in the presence of a catalyst such as benzoyl peroxide, and also for visually comparing products molded from the copolymer beads formed in accordance with this invention with a product molded from copolymer beads formed in an aqueous suspension in the presence of a catalyst such as benzoyl peroxide has been set up. With respect to the molded products, copolymer beads were pressed into plaques at 370° F. and 450° F., respectively, and held at the respective temperature for 10 minutes. The color index scale, in which the number is related to its adjacent color, is as follows:

1—water white
2—white
4—very slight yellow
6—slight yellow
8—yellow
10—very yellow
13—dark yellow
20—brown
>20—dark brown The following examples illustrate the invention, but are not to be construed as limiting. In these examples parts are by weight, unless otherwise specified.

EXAMPLE 1

To a suitable pressure reaction vessel containing 100 parts of distilled water are added 25 parts of styrene monomer, 7.5 parts of alpha-methylstyrene monomer, 17.5 parts of acrylonitrile, 0.15 part di-t-butyl-p-cresol and 0.7 part of lauroyl peroxide. The monomer mixture is polymerized at a temperature of 80° C. in an inert atmosphere under autogenous pressure. Calcium hydroxyapatite precipitated by a reaction between the required amounts of trisodium phosphate and calcium chloride is used as suspending agent. The degree of conversion is controlled by removal of the unreacted monomer through steam distillation. Upon completion of the polymerization, the polymer beads are thoroughly washed with water and dried in an air drier at 70° C. to 80° C. In the final copolymer there is 25.5% of combined acrylonitrile, by weight of the copolymer.

A portion of the polymer beads are pressed into a plaque at 370° F. and held at that temperature for 10 minutes. The color index number is 2. Another portion of the beads are pressed into a plaque at 450° F. and held at that temperature for 10 minutes. The color index number of the copolymer beads is 6. The polymer so formed has a viscosity of 16.2 centipoises when measured as a 10% by weight solution in methyl ethyl ketone at 25° C.

Polymer beads are prepared in accordance with the method set forth in Example 1, the amounts of the respective compounds and the temperature conditions being shown in Table I.

EXAMPLE 16

To a suitable vessel equipped with a reflux condenser containing 1200 parts of distilled water, are added 660 parts of styrene monomer, 120 parts of alpha methylstyrene monomer, 420 parts of acrylonitrile, 2.5 parts of di-t-butyl-p-cresol, and 8 parts of lauroyl peroxide. The monomer mixture is polymerized at a temperature of 75° C. in an inert atmosphere. Colloidized tricalcium phosphate is used as a suspending agent. The degree of conversion is controlled by removal of the unreacted monomer through steam distillation. Upon completion of the polymerization, the beads are thoroughly washed with water and dried in an air-drier at 70° C. to 80° C. In the final copolymer there are 25.5% of acrylonitrile combined, by weight of the copolymer.

A portion of the so-formed copolymer beads is pressed into a plaque at 370° F. and held at that temperature for 10 minutes, resulting in a color index number of 3. Another portion of the copolymer beads is pressed into a plaque at 450° F. and held at that temperature for 10 minutes, resulting in a color index number of 6. The color index number of the copolymer beads is 1, and the copolymeric product so formed has a viscosity of 16.5 centipoises when measured as a 10% by weight solution in methyl ethyl ketone at 25° C.

Copolymer beads may likewise be prepared, as in Example 16, using the water insoluble aliphatic peroxide, caprylyl peroxide, in place of the lauroyl peroxide, as in Examples 11–15, inclusive, supra.

Copolymer beads prepared in accordance with the method set forth in Example 16 using benzoyl peroxide as the catalyst instead of a water insoluble aliphatic peroxide, and the test plaques made therefrom are badly discolored and have color numbers of 9 at 370° F. and >20 at 450° F.

EXAMPLE 17

To a suitable pressure reaction vessel containing 1000 parts of distilled water, are added 250 parts of styrene monomer, 75 parts of alpha-methylstyrene monomer, 175 parts of acrylonitrile, 1.2 parts of di-t-butyl-p-cresol, and 8 parts of lauroyl peroxide. The monomer mixture is polymerized at a temperature of 85° C. under the application of a small inert pressure. Colloidized tricalcium phophate is used as suspending agent. The degree of conversion is controlled by removal of the unreacted monomer through steam distillation. Upon completion of the polymerization, the beads are washed thoroughly with water and dried in an air drier at 70° to 80° C. In the final copolymer there are 25.9% of acrylonitrile combined, by weight of the copolymer.

A portion of the copolymer beads are pressed into a plaque at 370° F. and held at that temperature for 10 minutes, resulting in a color index number of 2. Another portion of the copolymer beads is pressed into a plaque at 450° F. and held at that temperature for 10 minutes, resulting in a color index number of 5. The color index number of the copolymer beads is 1, and the copolymeric product so formed has a viscosity of 10.2 centipoises when measured as a 10% by weight solution in methyl ethyl ketone at 250° C.

EXAMPLE 18

The copolymer beads are prepared in accordance with the method described in Example 17 except that 9 parts myristyl peroxide is substituted for the lauroyl peroxide.

A portion of the copolymer beads are pressed with a plaque at 370° F. and held at that temperature for 10 minutes, resulting in a color index number of 2. Another portion of the copolymer bead is pressed into a plaque at 450° F. and held at that temperature for 10 minutes, resulting in a color index of 5. The color index number of the copolymer beads is 1, and the copolymeric product so formed has a viscosity of 11.7 centipoises when measured as a 10% by weight solution in methyl ethyl toluene at 25° C.

The amount of suspending agent used is preferably 0.2% to 0.5% but may vary from 0.1 to 5% based on the weight of the water used in the aqueous suspension.

As is quite obvious from the hereinabove set forth disclosure including the specific examples, we have found that water insoluble aliphatic peroxide, including caprylyl peroxide, lauroyl peroxide, myristyl peroxide and stearyl peroxide, catalyzed copolymerization of styrene and acrylonitrile in the presence of alpha-methylstyrene can be carried out at relatively low temperatures to give clear and non-discolored "solvent-resistant" polymeric compositions as hereinabove described.

Many changes and alterations may be made without departing from the spirit and scope of this invention which is set forth in the appended claims which are to be construed as broadly as possible in view of the prior art.

We claim:
1. The method of preparing thermoplastic resinous compositions which comprises copolymerizing at a temperature between about 60° C. and about 125° C., in aqueous suspension, until the conversion of monomer is between 60% and 92%, based on total monomer charge, a polymerizable composition comprising by weight about 22 to 45 parts acrylonitrile, about 5 to 35 parts alpha-methylstyrene, and about 75 to 30 parts styrene in the presence of from about 0.02% to 2.0%, by weight of the combined weight of the monomers, of a water insoluble aliphatic peroxide catalyst having the general formula

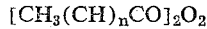
[CH$_3$(CH)$_n$CO]$_2$O$_2$ wherein $n$ is an integer of at least 6, thereby forming thermoplastic resinous compositions readily moldable to substantially non-discolored products.

2. The method of preparing thermoplastic resinous compositions which comprises copolymerizing at a temperature between about 65° C. and about 90° C., in aqueous suspension, until the conversion of monomer is between 65% and 85%, based on total monomer charge, a polymerizable composition comprising by weight about 22 to 45 parts acrylonitrile, about 5 to 35 parts alpha-methylstyrene, and about 75 to 30 parts styrene in the presence of from about 0.1% to 1.6%, by weight of the combined weight of the monomers, of a water insoluble aliphatic peroxide catalyst having the general formula

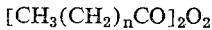
[CH$_3$(CH$_2$)$_n$CO]$_2$O$_2$ wherein $n$ is an integer of at least 6, thereby forming thermoplastic resinous compositions readily moldable to substantially non-discolored products.

3. The method of preparing thermoplastic resinous compositions which comprises copolymerizing at a temperature between about 60° C. and about 125° C., in aqueous suspension, until the conversion of monomer is between 60% and 92%, based on total monomer charge, a polymerizable composition comprising by weight about 22 to 45 parts acrylonitrile, about 5 to 35 parts alpha-methylstyrene, and about 75 to 30 parts styrene in the presence of from about 0.2% to 2.0%, by weight of the combined weight of the monomers, of caprylyl peroxide, thereby forming thermoplastic resinous compositions readily moldable to substantially non-discolored products.

4. The method of preparing thermoplastic resinous compositions which comprises copolymerizing at a temperature between about 60° C. and about 125° C., in aqueous suspension, until the conversion of monomer is between 60% and 92%, based on total monomer charge, a polymerizable composition comprising by weight about 22 to 45 parts acrylonitrile, about 5 to 35 parts alpha-methylstyrene, and about 75 to 30 parts styrene in the presence of from about 0.02% to 2.0%, by weight of the combined weight of the monomers, of lauroyl peroxide, thereby forming thermoplastic resinous compositions readily moldable to substantially non-discolored products.

5. The method of preparing thermoplastic resinous compositions which comprises copolymerizing at a temperature between about 60° C. and about 125° C., in aqueous suspension, until the conversion of monomer is between 60% and 92%, based on total monomer charge, a polymerizable composition comprising by weight about 22 to 45 parts acrylonitrile, about 5 to 35 parts alpha-methylstyrene, and about 75 to 30 parts styrene in the presence of from about 0.02% to 2.0%, by weight of the combined weight of the monomers, of myristoyl peroxide, thereby forming thermoplastic resinous compositions readily moldable to substantially non-discolored products.

6. The method of preparing thermoplastic resinous compositions which comprises copolymerizing at a temperature between about 60° C. and about 125° C., in aqueous suspension, until the conversion of monomer is between 60% and 92%, based on total monomer charge, a polymerizable composition comprising by weight about 22 to 45 parts acrylonitrile, about 5 to 35 parts alpha-methylstyrene, and about 75 to 30 parts styrene in the presence of from about 0.02% to 2.0%, by weight of the combined weight of the monomers, of stearoyl peroxide, thereby forming thermoplastic resinous compositions readily moldable to substantially non-discolored products.

7. The method of preparing thermoplastic resinous compositions which comprises copolymerizing at a temperature between about 65° C. and about 90° C., in aqueous suspension, until the conversion of monomer is between 65% and 85%, based on total monomer charge, a polymerizable composition comprising by weight about 22 to 45 parts acrylonitrile, about 5 to 35 parts alpha-methylstyrene, and about 75 to 30 parts styrene in the presence of from about 0.1% to 1.6%, by weight of the combined weight of the monomers, of caprylyl peroxide, thereby forming thermoplastic resinous compositions readily moldable to substantially non-discolored products.

8. The method of preparing thermoplastic resinous compositions which comprises copolymerizing at a temperature between about 65° C. and about 90° C., in aqueous suspension, until the conversion of monomer is between 65% and 85%, based on total monomer charge, a polymerizable composition comprising by weight about 22 to 45 parts acrylonitrile, about 5 to 35 parts alpha-methylstyrene, and about 75 to 30 parts styrene in the presence of from about 0.1% to 1.6%, by weight of the combined weight of the monomers, of lauroyl peroxide, thereby forming thermoplastic resinous compositions readily moldable to substantially non-discolored products.

9. The method of preparing thermoplastic resinous compositions which comprises copolymerizing at a temperature between about 65° C. and about 90° C., in aqueous suspension, until the conversion of monomer is between 65% and 85%, based on total monomer charge, a polymerizable composition comprising by weight about 22 to 45 parts acrylonitrile, about 5 to 35 parts alpha-methylstyrene, and about 75 to 30 parts styrene in the presence of from about 0.1% to 1.6%, by weight of the combined weight of the monomers, of myristoyl peroxide, thereby forming thermoplastic resinous compositions readily moldable to substantially non-discolored products.

10. The method of preparing thermoplastic resinous compositions which comprises copolymerizing at a temperature between about 65° C. and about 90° C., in aqueous suspension, until the conversion of monomer is between 65% and 85%, based on total monomer charge, a polymerizable composition comprising by weight about 22 to 45 parts acrylonitrile, about 5 to 35 parts alpha-methylstyrene, and about 75 to 30 parts styrene in the presence of from about 0.1% to 1.6%, by weight of the combined weight of the monomers, of stearoyl peroxide, thereby forming thermoplastic resinous compositions readily moldable to substantially non-discolored products.

No references cited.

JOSEPH L. SCHOFER, *Primary Examiner.*

UNITED STATES PATENT OFFICE
CERTIFICATE OF CORRECTION

Patent No. 3,201,375                                         August 17, 1965

Arnold B. Finestone et al.

It is hereby certified that error appears in the above numbered patent requiring correction and that the said Letters Patent should read as corrected below.

Column 3, formula "(5)" should appear as shown below instead of as in the patent:

$$[CH_3(CH_2)_{16}CO]_2O_2$$

column 7, line 53, the formula should appear as shown below instead of as in the patent:

$$[CH_3(CH_2)_nCO]_2O_2$$

Signed and sealed this 5th day of April 1966.

(SEAL)
Attest:

ERNEST W. SWIDER                                  EDWARD J. BRENNER
Attesting Officer                               Commissioner of Patents